O. R. H. ZEITZ.
MACHINE FOR THE MANUFACTURE OF ROOF TILES OR OTHER SIMILAR ARTICLES.
APPLICATION FILED NOV. 21, 1911.
1,063,234.
Patented June 3, 1913.
7 SHEETS—SHEET 3.
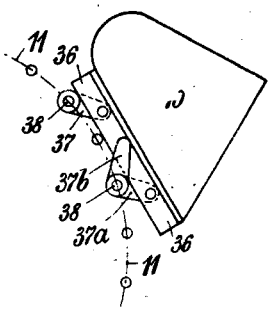
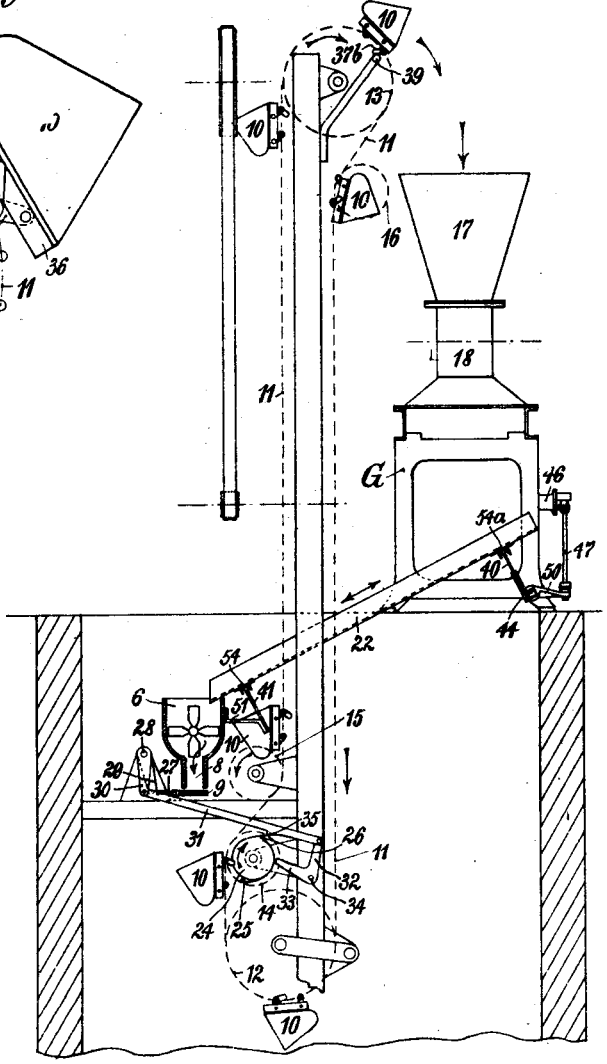

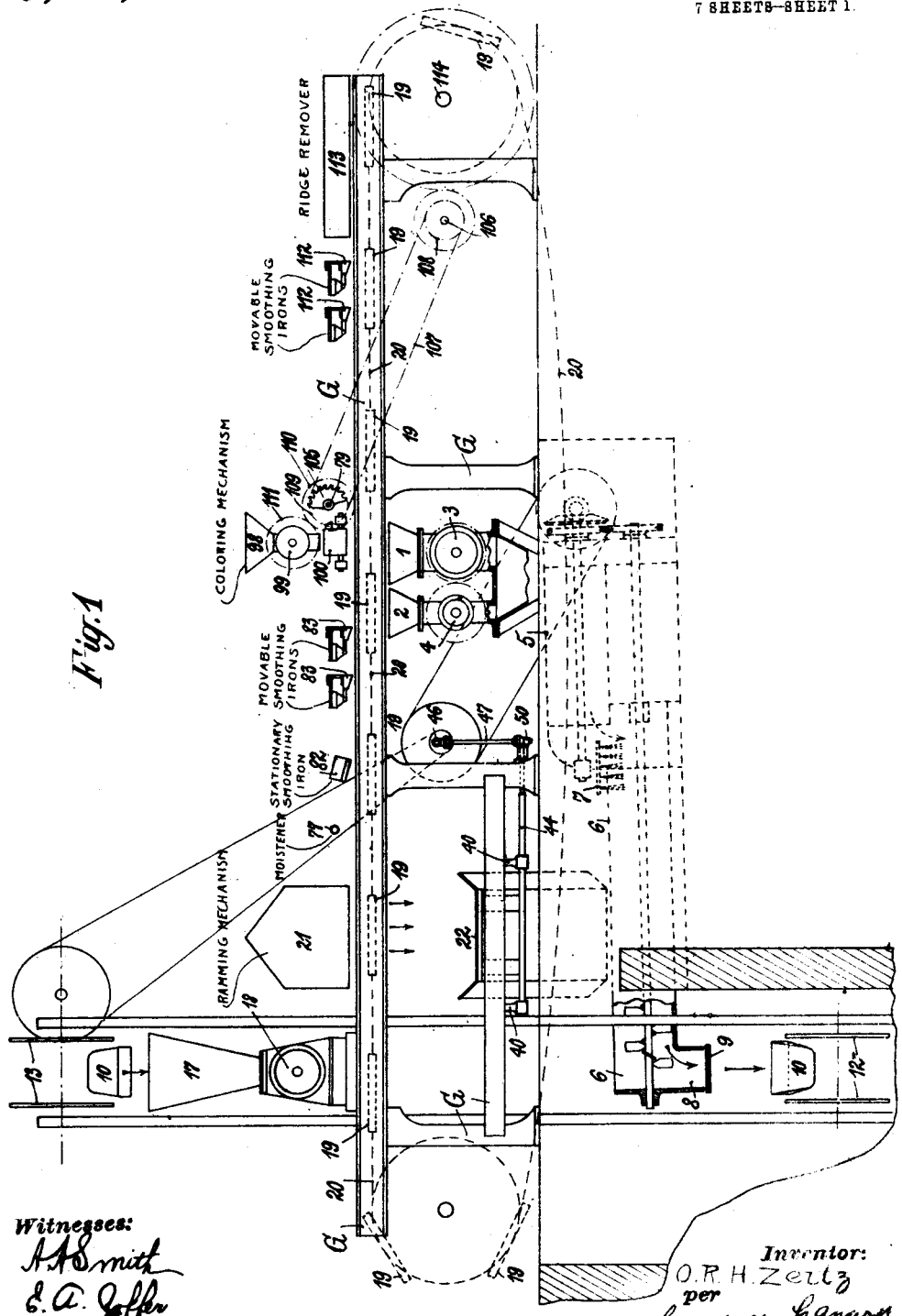

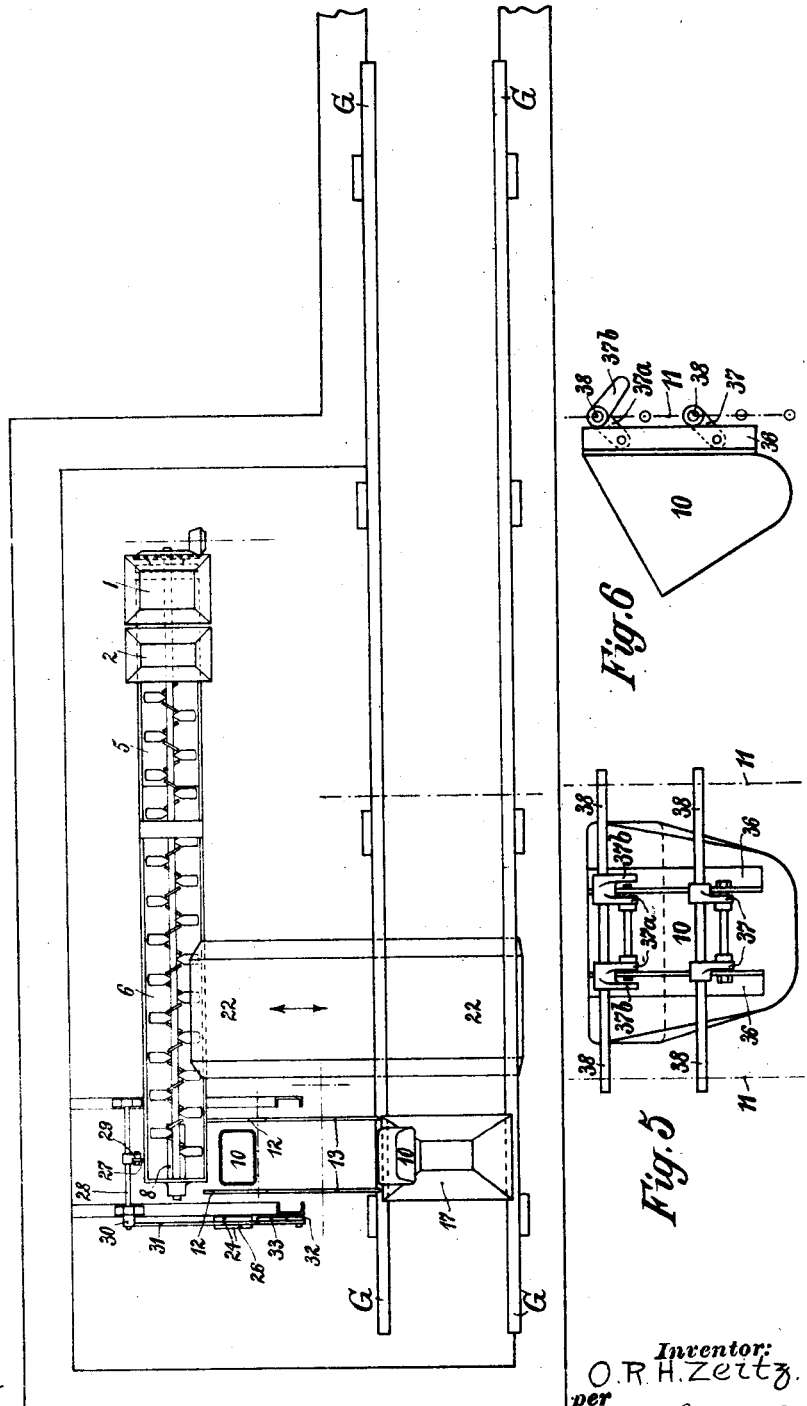

O. R. H. ZEITZ.
MACHINE FOR THE MANUFACTURE OF ROOF TILES OR OTHER SIMILAR ARTICLES.
APPLICATION FILED NOV. 21, 1911.
1,063,234.
Patented June 3, 1913.
7 SHEETS—SHEET 4.
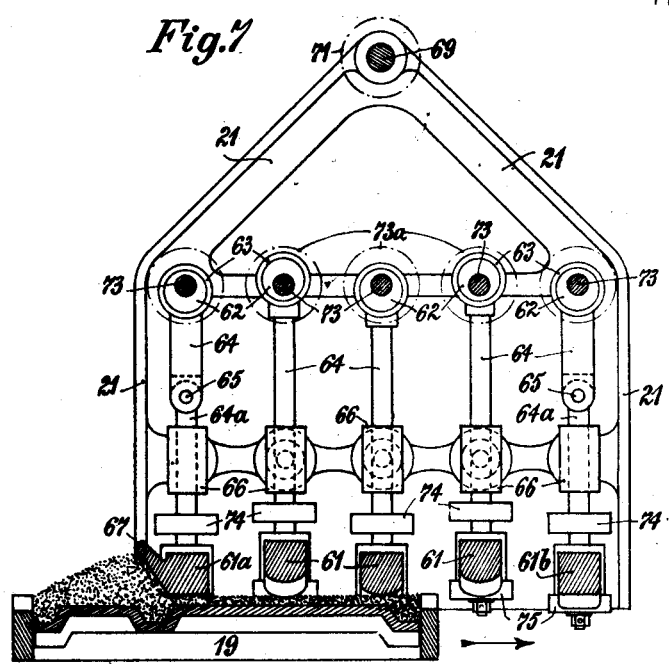
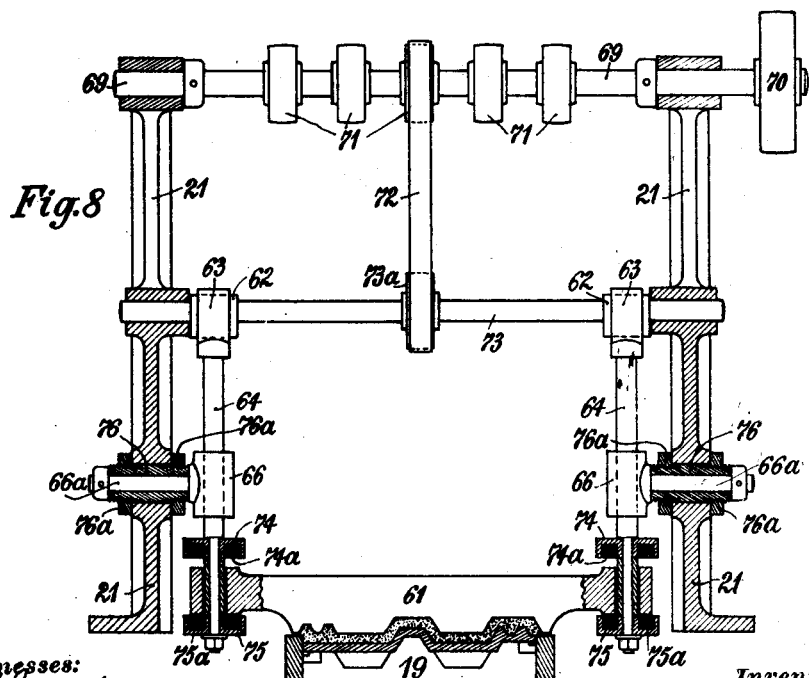
Witnesses:
Inventor:
O. R. H. Zeitz.
per
Lawrence Langner
Attorney.

C. R. H. ZEITZ.
MACHINE FOR THE MANUFACTURE OF ROOF TILES OR OTHER SIMILAR ARTICLES.
APPLICATION FILED NOV. 21, 1911.
1,063,234.  Patented June 3, 1913.
7 SHEETS—SHEET 5.
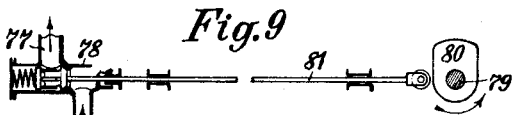
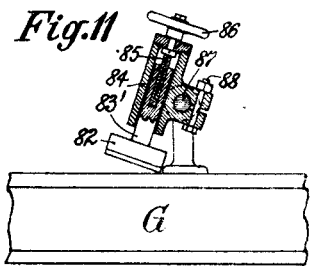
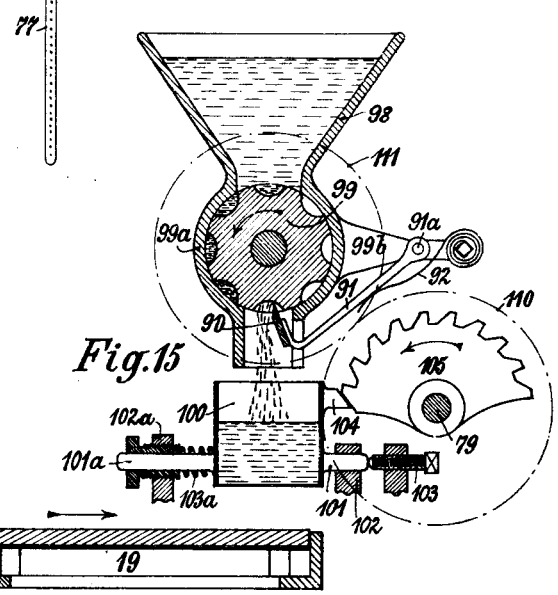
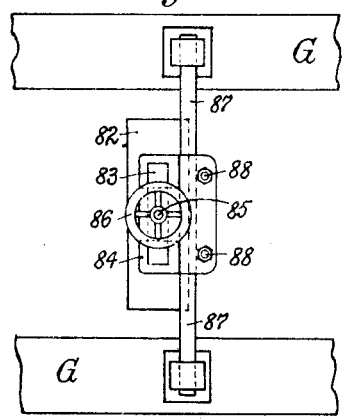
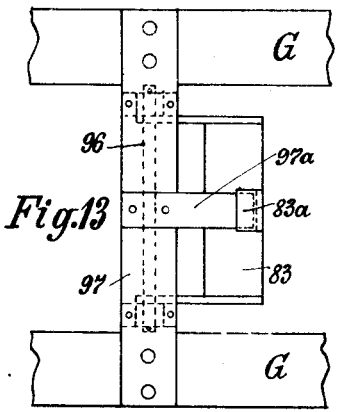
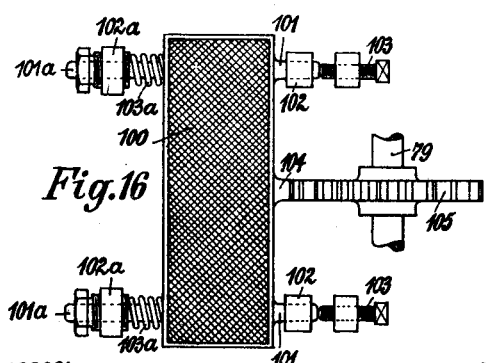
Witnesses:
Inventor:
O. R. H. Zeitz.
per Lawrence Langner
Attorney.

O. R. H. ZEITZ.
MACHINE FOR THE MANUFACTURE OF ROOF TILES OR OTHER SIMILAR ARTICLES.
APPLICATION FILED NOV. 21, 1911.
1,063,234.
Patented June 3, 1913.
7 SHEETS—SHEET 6.
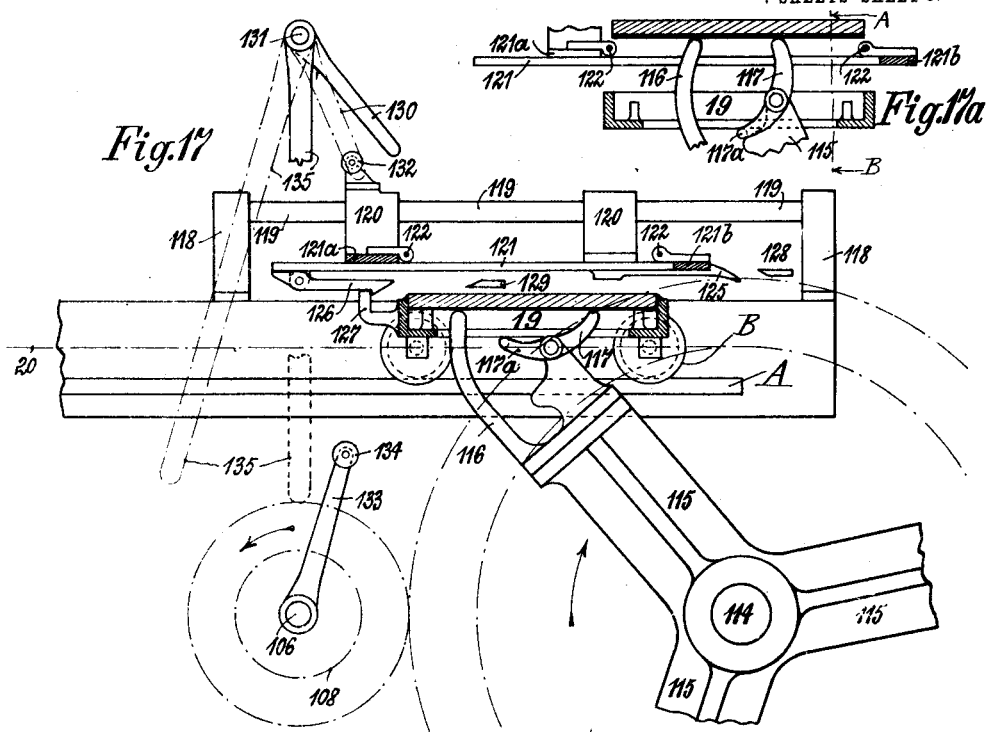
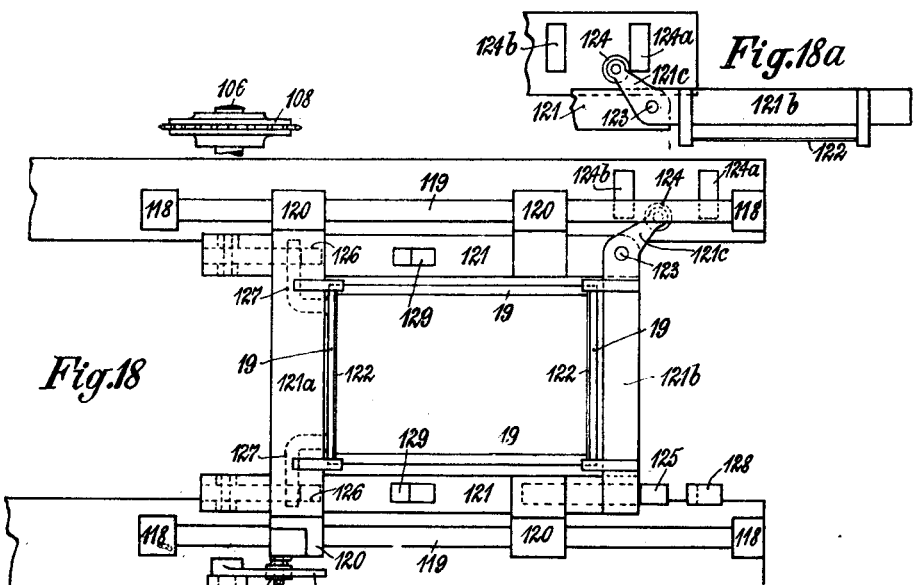
Witnesses:
Inventor
O. R. H. Zeitz.
per Lawrence Lanquel
Attorney

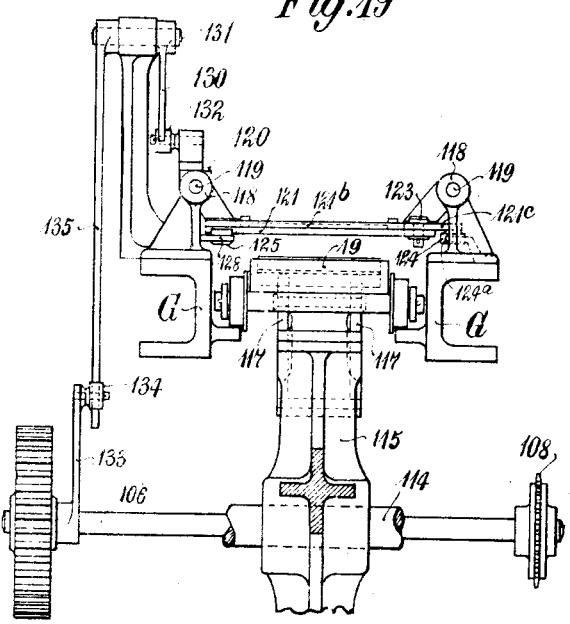
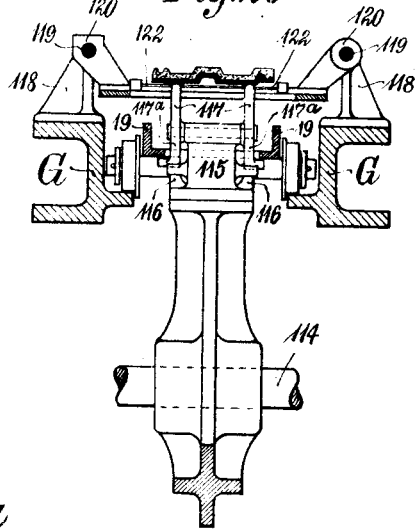

UNITED STATES PATENT OFFICE.

OTTO ROBERT HERMANN ZEITZ, OF KIEL, GERMANY.

MACHINE FOR THE MANUFACTURE OF ROOF-TILES OR OTHER SIMILAR ARTICLES.

1,063,234.

Specification of Letters Patent.

Patented June 3, 1913.

Application filed November 21, 1911. Serial No. 661,601.

*To all whom it may concern:*

Be it known that I, OTTO ROBERT HERMANN ZEITZ, a subject of the Emperor of Germany, residing at Kiel, Germany, whose post-office address is care of The Kieler Maschinenbau-Aktiengesellschaft vorm. C. Daevel, of Kiel, in the German Empire, have invented certain new and useful Improvements in Machines for the Manufacture of Roof-Tiles or other Similar Articles, of which the following is a specification.

This invention relates to a machine for the manufacture of roof tiles or other plate-shaped articles from cement and other suitable mixtures in which the mold boxes with loose bottoms are secured to continuously driven endless chains.

In accordance with the invention a measured quantity of the mixture employed is supplied through a feed device of any convenient kind to the mold boxes; this mixture is uniformly distributed and rammed whereupon the surface of the molded article is moistened for the purpose of cleaning it, and it is then scraped smooth and coloring material is sprinkled upon it. After the color has been absorbed by the moisture of the tile the surface of the latter is polished and finally the finished tile together with the bottom of the mold box is removed. All these operations are automatically effected by the machine in a continuous operation while the mold boxes are continuously fed forward beneath the various mechanically operated devices for effecting the several operations so that the plate-shaped bodies are manufactured entirely automatically during this continuous operation.

The machine in accordance with this invention is illustrated in the accompanying drawing, in which:

Figure 1 is a side elevation. Fig. 2 is a plan. Fig. 3 is a rear elevation partly in section. Fig. 3ª and Figs. 4 to 18 illustrate details. Fig. 3ª is a side elevation showing to a larger scale the lowered position of an elevator bucket at the moment that it is being emptied. Fig. 4 is a side elevation of the machine elements illustrated in the lower part of Fig. 3 in a different position. Fig. 5 is a rear elevation of one of the elevator buckets. Fig. 6 is a side elevation thereof. Figs. 7 and 8 illustrate the ramming device, Fig. 7 being a side elevation and Fig. 8 a front elevation thereof. Figs. 9 and 10 show the moistening apparatus in side elevation and in plan. Figs. 11 and 12 show in side elevation and plan partly in section the fixed but adjustable scraping irons. Figs. 13 and 14 show in plan and cross section one of the movable scraping or polishing irons. Fig. 15 shows the coloring apparatus in vertical central section. Fig. 16 is a plan of the sieve belonging thereto. Figs. 17 and 18 are a side elevation and a plan partly in section of the apparatus for removing the finished plate-shaped object comprising a ridge removing device. Fig. 17ª shows the position of the fingers of the lifting device when the molded article is lifted out and Fig. 18ª shows the open frame of the ridge moving device. Fig. 19 is a rear elevation of the lifting device for the finished plate-shaped object, with ridge severer. Fig. 20 is a cross section on the line A B in Fig. 17ª.

The ready mixed material is delivered in uniform quantities into the buckets of an elevator which deliver it to the distributer and the latter supplies it to the mold boxes where it is acted upon by plungers or the like, the material in excess falling onto an obliquely arranged shaking channel by which it is reconducted to the mixing apparatus so that it can be used again. The mixed material is automatically transported throughout its entire path in such a manner that none of it is lost.

The materials for manufacturing the mixture such as sand and cement for example are discharged into the hoppers 1 and 2 and from the apparatus 3 and 4 located beneath same in the proper proportions into a trough 5 in which they are intimately mixed in a dry state. The dry mixture falls from the trough 5 into a second trough 6 where it is moistened by the nozzle 7 and mixed in a wet state. On the rear end the trough 6 is provided with an opening 8 through which the wet mixture is periodically discharged into the buckets of an elevator. For this purpose a slide 9 is reciprocated beneath the opening 8, the buckets 10 of the elevator being brought beneath the opening 8 in such a manner that only one bucket can be supplied with the material at one time. At the upper part of the apparatus the buckets 10 of the elevator are guided and actuated in such a manner that they discharge their contents at a given place with absolute certainty and completely into the hopper 17 of the distributer 18.

The buckets 10 are suspended on the two chains 11 at a given uniform distance one from the other; these chains run over chain wheels 12 and 13 of which the two upper wheels 13 may be driven. The spindle of the lower chain wheels 12 is located behind the cheeks of the elevator and that of the upper chain wheels in front thereof. By the provision of small chain wheels or supporting rollers 14, 15 and 16 of which the pair 14 are arranged inside the chains 11 and the two pairs 15 and 16 outside them the elevator is caused to project to the rear at its lower end and to the front at its upper end in order to insure that at the lower part the mixed material will certainly pass from the trough 6 when the slide 9 is opened into the buckets 10, which are preferably guided for a short length vertically beneath the opening 8, and that at the upper part the buckets 10 may be discharged with certainty into the hopper 17 of the distributer 18 (see Fig. 3).

From the distributer 18 the mixture reaches the mold boxes 19 located beneath it; as shown in the drawing a large number of these boxes can be arranged equidistant from each other on a continuously driven endless chain 20. Now it is necessary that a considerably larger quantity of the mixture should be supplied to each mold box than the quantity which will eventually form the plate-shaped object in order that a full and compact profile should be obtained. When the mass is treated by the ramming mechanism 21 the excess falls from the mold boxes and is caught in a shaking channel 22 arranged obliquely in the transverse direction of the machine; from this channel it passes back into the trough 6 (the wet mixer) in which it is combined with the fresh material.

The displacement of the slide 9 beneath the opening 8 in the wet mixer 6 is produced by operating mechanism actuated by the elevator. In the construction illustrated the movement is produced in the following manner: A disk 24 presenting on its periphery noses 25 and 26 is rigidly mounted on the shaft of the two chain wheels or supporting rollers 14. The slide 9 is connected by the links 27 with the arm 29 rigidly fixed to the shaft 28. Another arm 30 is fixed on this shaft 28 and by means of the rod 31 is connected with the arm 32 of the bell crank lever rotatable about the pivot 34, the other arm 33 of this lever extending into proximity with the periphery of the disk 24. The rod 31 is provided with a nose 35. The nose 25 of the disk 24 alternately strikes against the arm 33 of the bent lever 32, 33 and the nose 26 against the nose 35 on the rod 31 thus producing the opening and the closing of the slide 9. Fig. 3 shows the closed position of the slide 9 and Fig. 4 its open position. The mechanism for opening and closing the slide 9 in Fig. 1 has been omitted for the sake of clearness.

Upon the conveyance of moist sand cement mixture with elevators of the ordinary construction a considerable portion of the mass remains adhering to the walls of the buckets when the latter are being emptied thus rendering reliable transportation of such material impossible. This defect is obviated in accordance with the present invention owing to the automatic actuation of the buckets at the moment of emptying them which is produced by means of their special method of suspension.

Figs. 5 and 6 show to an enlarged scale one of the buckets in rear elevation and in side elevation respectively. Two angle bars 36, 36 are rigidly secured to the rear wall of each bucket 10; by means of links 37, 37ª these bars are connected with the bars 38, 38 which unite the link chains 11. Two of these links, the links 37ª for example are provided with arms 37ᵇ which shortly after the commencement of the downward movement of the buckets 10 strike against a transverse bar 39 arranged between the chain wheels 13 whereby the bucket 10 is caused to fall suddenly and rapidly and simultaneously the arms 37ᵇ of the links 37ª strike against the rear wall of the bucket or the arm of the angle bar 36 connected therewith so that the bucket is completely emptied (Fig. 3ª).

The shaking channel 22 is arranged on leaf springs 40, 41, Fig. 3. The springs 40 are secured by their lower ends to a shaft 44 which is rocked by a crank on a shaft 46 by the intermediary of the rod 47 and arm 50. The other springs 41 rest with their lower ends on arms 51 on the trough 6 while their upper ends are provided with a protuberance 54 located between two ledges secured to the channel 22. The upper ends 54ª of the springs 40 are similarly formed and arranged. The shaking channel 22 therefore rests loosely on the protuberances 54, 54ª of the leaf springs 40, 41.

After the material has passed from the distributer 18 in a heap on the front end of the mold box it is distributed and rammed these operations being simultaneously effected by means of the ramming mechanism 21 (Fig. 1) shown in Figs. 7 and 8. This mechanism consists of a series of plungers arranged in succession. While the foremost and the rearmost plungers 61ª and 61ᵇ effect only a vertical movement the plungers 61 located between them are given an oscillating movement in addition to this vertical movement so that they describe an ellipsoidal path and thus ram the material in a manner similar to that effected by hand and at the same time effect a scraping or smoothing movement. All the plungers are similarly formed on their lower face to the plate-shaped bodies to be manufactured. In the construction here illustrated five plungers are provided and are actuated by eccentrics 62 the straps 63 of which are provided with rods 64. The two outermost rods consist of two parts 64 and 64ª connected one with the other by a link 65. The lower portions 54ª of these two outermost rods and also the undivided rods 64 are guided in sleeves 66 of which the sleeves of the rods 64 are rotatable about horizontal pivots. The sleeves 66 guiding the rod members 64ª are rigid.

The first plunger 61ª which serves to distribute the material discharged onto the mold 19 is provided with a forwardly directed inclined front wall 67 which during the continuous forward movement of the mold box 19 and owing to the continuous upward and downward movement of the plunger 61ª exerts an intermittent action on the material by means of which the latter is uniformly distributed over the entire mold 19. The following plungers 61 which in view of the movement of their eccentrics describe an ellipsoidal path and consequently exert a scraping or smoothing action on the material similar to that of hand labor exert a vigorous action in the mold 19 in order to impart the necessary uniform density and strength to the molded article. The movement of the plungers 61 is from front to rear relatively to the direction of travel of the mold box 19 (see the arrow in Fig. 7). The last plunger 61ᵇ which like the first plunger 61ª only moves upward and downward gives its exact profile to the molded article.

The shaft 69 mounted in the frame 21 and driven in any convenient manner such for example as by the belt pulley 70 receives the pulleys 71 which are fixed upon it and are connected by belts 72 with the pulleys 73ª on the shaft 73; each of these latter pulleys receives two eccentrics 62 for operating a plunger 61, 61ª, 61ᵇ. The latter are displaceably arranged on the eccentric rods 64 and 64ª each of them being located between two collars 74 and 75 arranged on these rods provided with yielding elements 74ª and 75ª in order to act resiliently and noiselessly upon the plungers 61, 61ª and 61ᵇ which move upward and downward at a high speed and which also move quickly between the collars.

The sleeves 66 in which the eccentric rods 61, 61ª 61ᵇ are guided are provided with pins 66ª (Fig. 8) mounted in bushes 76 provided on both ends with screw threads for the reception of the nuts 76ª and which are displaceable in the frame 21 so that all the plungers 61, 61ª and 61ᵇ can be readily and speedily brought into line because the mechanical treatment of the cement mortar necessitates that the profiles of all the plungers should exactly register.

A perforated pipe 77 for moistening the molding is arranged behind the plunger mechanism. It is fitted to a valve 78 which is opened periodically when the molding comes beneath the pipe 77 and is again closed when it has proceeded on its path. The valve is opened by a cam plate 80 mounted on the shaft 79 which at given intervals of time actuates a rod 81 connected with the obturating member of the valve. The valve is closed automatically preferably by means of a suitable spring (see Figs. 9 and 10).

When the mold has been moistened it passes beneath one or more fixed smoothing irons 82 and then beneath one or more movable troweling or rubbing irons 83 all of which present the same profile as the plungers. The stationary smoothing iron acts upon the surface of the shaped and moistened material to insure a perfectly smooth and even surface thereof. The movable troweling irons 83 act upon the moistened and smoothed material and serve to place a finished surface thereon, preparatory to the coloring of the material at the next stage of the operation. Each of the fixed smoothing irons 82 the lower face of which is inclined from rear to front is rotatable, adjustable vertically and adapted to be fixed in any desired position. A constructional form of this device is illustrated by way of example in Figs. 11 and 12. The smoothing iron 82 is provided with a pin 83′ which is preferably wide and thin and which is fitted into a correspondingly formed block 84. This iron 82 is adapted to be adjusted in the vertical direction and fixed in some convenient manner such for example as by a spindle 85 and hand wheel 86. The block 84 is mounted on a fixed shaft 87 on which it is clamped by means of the screws 88 upon the slackening of which it can be adjusted.

Each of the movable smoothing irons 83 is suspended by two or more arms 95 on a shaft 96 and is provided with a bent arm 83ª which bears upon an arm 97ª which is fixed upon a cross bar 97 connecting the cheeks of the machine frame G; the bearings for the shaft 96 are also mounted on this cross bar. By means of this arrangement the smoothing irons 83 can move freely upward while their downward movement is limited by the fixed arm 97 (see Figs. 13 and 14).

After passing the movable smoothing irons 83 the mold box 19 comes beneath the coloring device (Figs. 15 and 16). This consists of a hopper 98 for the reception of the pulverulent coloring material, a cell drum 99 arranged beneath the hopper and a sieve 100 arranged beneath this drum. This sieve is displaceable by means of studs 101, 101ᵃ in bearings 102, 102ᵃ in the longitudinal direction of the machine; it is pressed by adjustable springs 103ᵃ against fixed but adjustable stops 103 and is provided with a nose 104 on which a toothed sector 105 fixed on the shaft 79 acts in such a manner that owing to its displacement by the teeth of the sector 105 and in the opposite direction by the springs 103ᵃ the sieve 100 effects a quick reciprocating movement. The toothed sector 105 is driven off the shaft 106 by means of the chain 107 and the chain wheels 108, 109 and imparts the movement thus transmitted to it to the cell drum 99 through the spur wheels 110, 111 (Figs. 1 and 15). As soon as the mold 19 has reached the sieve 100 the latter is given a shaking movement by the continuously rotating toothed sector 105 this shaking movement being interrupted when the mold has passed the sieve 100. As even a small amount of moisture would cause the retention of the coloring material in the cells of the drum in order to avoid this a scraper 90 is provided on the free end of a rotatably mounted arm 91; by means of a spring 92 or the like this scraper is pressed against the peripheral face of the drum 99 and into its cells while it rotates. By this means the coloring material is scraped out of the cells. The arm 91 is suspended on the pivot 91ᵃ of a bearing block 99ᵇ fixed on the casing 99ᵃ of the cell drum 99 which bearing also serves for securing the spring 92 acting on the arm 91 of the scraper 90. It will of course be understood that this scraper 90 might be mounted and acted upon in any other convenient manner. The molding now comes beneath the polishing irons 112 which like the smoothing irons 83 are movable; they are arranged and operate in the same maner as the smoothing irons 83.

It may sometimes be necessary to produce an uncolored tile, in which case, the coloring of the material may be omitted. The use of one of the sets of movable smoothing irons 83 and 112 may then be dispensed with as the other set will serve to place a finished surface on the tile. Obviously, both sets may be employed if deemed advisable when the coloring is omitted to insure a more complete finishing or polishing of the surface of the tile. All that now remains to be done is to lift the molding together with the bottom of the mold box from the box 19 and at the same time to remove the ridge or sharp edge from the front and rear end of the molding. With this object a ridge remover 113 (Fig. 1) is arranged behind the polishing irons 112; this is shown diagrammatically on Fig. 1 and coöperates with the lifting device (Figs. 17 and 20). Arms 115 are fixed to the chain wheel shaft 114 (Fig. 17); each of these arms is provided with two fixed and two movable fingers 116 and 117. Each of the latter is formed as a two-armed lever.

Each of the mold boxes is provided with a longitudinal slot or opening therein to permit the fingers 116 and 117 to pass therethrough into engagement with the removable bottom of the mold box, as clearly shown in Figs. 17 and 17ᵃ. The arm 117ᵃ of the movable finger 117 is provided with a transverse projection, such as a rod or roller shown by the dotted lines at the extreme end of arm 117ᵃ in Figs. 17 and 17ᵃ. This transverse member engages that portion of the mold box adjacent the opening and swings the finger 117 into engagement with the bottom of the mold box. As the arm 115 continues its rotation, the lifting extremities of the fingers 116 and 117 will remain in the same relative horizontal plane and therefore lift the mold box bottom together with the molded article without tilting the same.

A rectangular frame is suspended by means of the eyes 120 on rods 119 fixed in blocks 118; the front cross member 121ᵇ of this frame is rotatably connected with one of its longitudinal members and detachably connected with its other longitudinal member. Wires 122 are stretched along the cross members 121ᵃ and 121ᵇ of this frame and the front cross member 121ᵇ which is rotatable about the pin 123 of one of the longitudinal frame members carries an arm 121ᶜ with a roller 124 which is arranged with play between two stops 124ᵃ and 124ᵇ. The other end of the front cross frame member 121ᵇ is held on the other longitudinal member of the frame 121 by a pawl 125. On the rear ends of the longitudinal frame members 121, pawls 126 are rotatably arranged and at its rear each mold box 19 is provided with arms 127 which during the movement of the box encounter the pawls 126 and displace the frame 121, 121ᵃ, 121ᵇ at the same time as the wires 122 are located exactly perpendicularly over the inner edges of the front and rear walls of the mold box 19. At this moment the fingers 116 and 117 have reached the bottom of the mold box and begin to lift it and the molded article out of the box 19. When the bottom of the mold box has reached the wires 122 (Fig. 17ᵃ) that is to say when the ridge or sharp edge has been removed from the molded article by them the pawls 125 encounter a fixed stop 128 whereby the front transverse member 121ᵇ of the frame is released from its engagement with the said pawl. Immediately thereafter the roll 124 of the arm 121ᶜ encounters the fixed stop 124ᵃ (Fig. 18) whereby as the frame 121, 121ᵃ, 121ᵇ is moved farther forward its front cross member 121$^b$ is caused to rotate about the pin 123. It then assumes the position shown in Fig. 18$^a$, by virtue of which the aforesaid arms 117, 117$^a$ and figures 116 may continue in its rotation without obstruction. When this has been effected, as the pawls 126 engage with fixed stops 129 they are lifted clear of the arms 127 of the mold box so that the forward movement of the frame is stopped. The frame is then returned to its initial position and this can be effected in any suitable manner, for example by means of an arm 130 mounted on a shaft 131 which is rotated off the shaft 106, the arm 130 encountering a roller 132 or the like arranged on one of the front eyes 120 of the frame 121, 121$^a$, 121$^b$, and moves the frame backward. During this backward movement of the frame, the roll 124 of the arm 121$^c$ encounters the stop 124$^b$ whereby the cross member 121$^b$ is rotated into its initial position, into engagement with the pawl 125. Thereupon, as will be obvious, the aforesaid series of operations recommence, as the next mold box 19 with its arm 127 comes into engagement with the pawl 126 of the frame and again carries this frame along with it.

Any suitable means may be provided for holding the mold members against the downward pressure exerted by the shaping means and by the smoothing means. A framework G is shown in the drawings for this purpose, the top part of which forms a trackway A adjacent the top run of the conveyer. Each mold member is provided with wheels B which engage the trackway A during the upper run of the conveyer and consequently, the mold member is rigidly supported when acted upon by the shapers and the smoothing means.

What I claim and desire to secure by Letters Patent of the United States is:—

1. In a machine of the kind described, molding means, conveying means adapted to move said molding means continuously through the machine, means for delivering a quantity of material into said molding means, means for automatically shaping said material into an article during the progress of the molding means, means for moistening the material so shaped, means comprising a fixed smoothing iron for smoothing the moistened material, means comprising movable irons for troweling or rubbing the smoothed material, and means for removing the article from the machine.

2. In a machine of the kind described, molding means, conveying means adapted to move said molding means continuously through the machine, means for delivering a quantity of material into said molding means, means for ramming and distributing the material therein to form an article, means for moistening the rammed material, means comprising a fixed iron for smoothing the surface of the moistened material, means comprising a movable iron for rubbing or troweling the smoothed material, means for coloring the troweled material, and means for removing the article from the machine.

3. In a machine of the kind described, molding means, conveying means adapted to move said molding means continuously through the machine, means for delivering a quantity of material into said molding means, means for automatically ramming and distributing the material therein to form an article, means for automatically moistening the rammed material, means comprising a movable iron for automatically troweling or rubbing the surface thereof, means for automatically coloring the troweled material, means comprising a polishing iron for automatically further troweling or rubbing the surface of the colored material to polish the same, means for automatically trimming the edges of the article, and means for automatically removing the article from the machine.

4. In a machine of the kind described, the combination of a series of molding means, means for supplying a quantity of material thereinto, conveying means adapted to move said molding means through the machine, means for automatically shaping said material into an article during the progress of the molding means, means for moistening the material so shaped, means comprising stationary irons for smoothing the surface of the moistened article, and means comprising movable irons to trowel or rub the smoothed material, and means for removing the article from the machine.

5. In a machine of the kind described, the combination of a series of mold boxes having removable bottoms, means adapted to contain a quantity of material, conveying means adapted to move said mold boxes through the machine, means for shaping the material into an article during the progress of the mold boxes, means to moisten the material so shaped, means comprising a fixed member to smooth the moistened material, means comprising movable members to trowel or rub the material so smoothed, means for removing the article together with the mold box bottom, and means coacting with the removing means to trim the edges of the article.

6. In a machine of the kind described, the combination of a series of mold boxes having removable bottoms adapted to contain a quantity of material, conveying means adapted to move said mold boxes continuously through the machine, means for shaping the material into an article during the progress of the mold boxes, a framework cooperating with and governed by the movement of the mold boxes, rotary means for lifting the article together with the mold-box-bottom from the mold box, means carried by said framework for trimming the edges of the molded article during the movement of said article and mold box bottom, and means for opening the framework to permit the rotary means to pass therethrough as the article is being removed.

7. In a machine of the kind described, the combination of a series of mold boxes having removable bottoms adapted to contain a quantity of material, conveying means adapted to move said mold boxes through the machine, means for shaping the material into an article during the progress of the mold boxes, a framework adapted to be engaged and displaced by the mold box, rotary means adapted to remove the mold-box-bottom together with the article thereon from the mold box, means carried by said framework adapted to trim the edges of the article during the removal of the article, means adapted to open said framework to permit the rotary means to pass therethrough, means adapted to disengage said framework from said mold box to effect the stopping of the forward movement of said framework means adapted to return the framework into its original position, and means for closing the framework during the return movement thereof.

In testimony whereof I affix my signature in presence of two witnesses.

OTTO ROBERT HERMANN ZEITZ.

Witnesses:
  JULIUS RÖPKE,
  FRIEDRICH BUROW.